United States Patent
Lemaire et al.

(10) Patent No.: US 7,369,495 B1
(45) Date of Patent: May 6, 2008

(54) METHOD AND APPARATUS FOR SHARED SHAPING

(75) Inventors: Thomas A. Lemaire, Acton, MA (US);
John C. Carney, Bedford, MA (US);
Paul Giacobbe, Townsend, MA (US);
Michael E. Lipman, Harvard, MA (US); Ryan T. Ross, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 731 days.

(21) Appl. No.: 10/934,558

(22) Filed: Sep. 7, 2004

(51) Int. Cl.
*H04J 3/14* (2006.01)
*H04J 3/24* (2006.01)
*H04L 12/28* (2006.01)

(52) U.S. Cl. .............. 370/230.1; 370/235; 370/395.42; 370/468

(58) Field of Classification Search ...................... None
See application file for complete search history.

(56) References Cited

U.S. PATENT DOCUMENTS

| | | | |
|---|---|---|---|
| 6,119,235 A * | 9/2000 | Vaid et al. | 726/11 |
| 6,292,465 B1 * | 9/2001 | Vaid et al. | 370/230 |
| 6,438,106 B1 * | 8/2002 | Pillar et al. | 370/232 |
| 6,842,783 B1 * | 1/2005 | Boivie et al. | 709/225 |
| 6,973,315 B1 * | 12/2005 | Miernik et al. | 455/452.2 |
| 6,980,511 B1 * | 12/2005 | Li et al. | 370/230 |

* cited by examiner

*Primary Examiner*—Chi Pham
*Assistant Examiner*—Soon D. Hyun
(74) *Attorney, Agent, or Firm*—Harrity Snyder, LLP

(57) ABSTRACT

A method and a network device for sharing bandwidth among a group of classes of traffic for an interface are provided. Bandwidth may be allocated to at least one traffic class of a first priority for the interface. At least some unused bandwidth of the at least one traffic class may be allocated to at least one other traffic class of a second priority for the interface. In some implementations, weighted constituents may be allocated unused interface bandwidth based on an assigned weight of each of the weighted constituents of the interface.

13 Claims, 14 Drawing Sheets

METHOD AND APPARATUS FOR SHARED SHAPING

TECHNICAL FIELD

Systems and methods consistent with the principles of the invention relate generally to computer networks and, more particularly, to sharing bandwidth among different priorities or classes of subscriber traffic.

BACKGROUND OF THE INVENTION

Network providers generally configure their network devices to treat some classes of traffic differently from other classes of traffic. For example, voice reproduced from network voice traffic may be distorted when it is delayed. Therefore, a network provider may configure network devices to forward a voice traffic class according to a highest or strict priority. Video reproduced from video traffic is less affected by delays than voice traffic. Therefore, the network provider may configure network devices to forward a video traffic class at a lower priority than the voice traffic class. Data traffic is less affected by delays than either the video or the voice traffic. Consequently, the network provider may configure the network devices to treat a data traffic class according to a best effort or a lower priority than that assigned to either the voice traffic class or the video traffic class.

Network providers generally use a hierarchical scheduler, implemented within the network devices, to schedule the forwarding of traffic via logical interfaces according to the traffic's associated priority. The priority may be based on the class of traffic, such as, for example, voice, video, and data classes. The hierarchical scheduler may include multiple scheduler nodes. Each scheduler node may be associated with a priority. For example, one scheduler node may process all high priority traffic for a logical interface and another scheduler node may process all medium priority traffic for the logical interface. The hierarchical scheduler may provide the network provider with the ability to configure a separate scheduler node for each of the priorities. Thus, each scheduler node of a network device may receive traffic of a particular priority and may forward the traffic to one or more logical interfaces, such as, for example, virtual circuits (VCs). Because some of the scheduler nodes may be in separate hierarchies or priorities, unused bandwidth for a logical interface in one hierarchy is not shared with a logical interface queue of another hierarchy. For example, if voice traffic for a first virtual circuit is low, the unused bandwidth cannot be used by the first virtual circuit in another hierarchy, such as one that carries video or data traffic. Many network providers "carve out" bandwidth for logical interfaces by configuring rate or bandwidth limits for each hierarchy. However, the "carve out" does not provide for bandwidth sharing among different hierarchies when bandwidth use of a logical interface by high priority traffic is low.

SUMMARY OF THE INVENTION

In a first aspect, a method for sharing bandwidth among a group of classes of traffic for an interface is provided. Bandwidth is allocated to at least one traffic class of a first priority for the interface. At least some unused bandwidth of the at least one traffic class is allocated to at least one other traffic class of a second priority for the interface.

In a second aspect, a network device for receiving and forwarding traffic in a computer network is provided. The network device is configured to provide bandwidth for at least one traffic class of a first priority of an interface, and provide at least some of unused bandwidth of the at least one traffic class for at least one other traffic class of a second priority.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Figure 1:
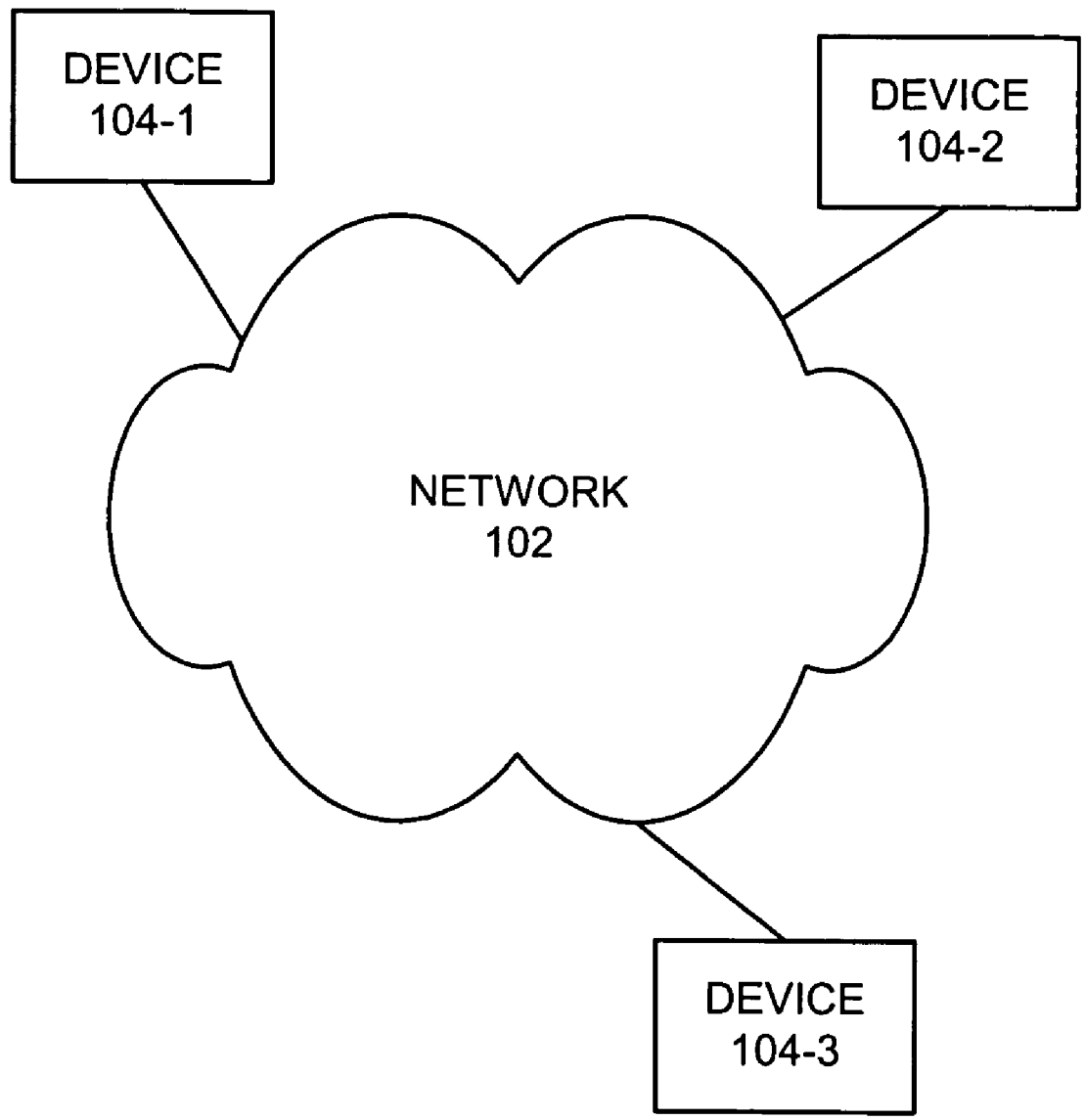
FIG. 1 illustrates an exemplary system which may include implementations consistent with principles of the invention.

FIG. 1 illustrates an exemplary system 100, which includes an implementation consistent with the principles of the invention. System 100 may include a network 102, and devices 104-1, 104-2 and 104-3 (hereinafter collectively referred to as devices 104) connected to network 102. Devices 104 may be servers, host computers, personal computers, wireless PDAs or any other device capable of connecting to a network. System 100 may include more or fewer components than shown in FIG. 1. For example, system 100 may have more or fewer devices 104 connected to network 102.

Figure 2:
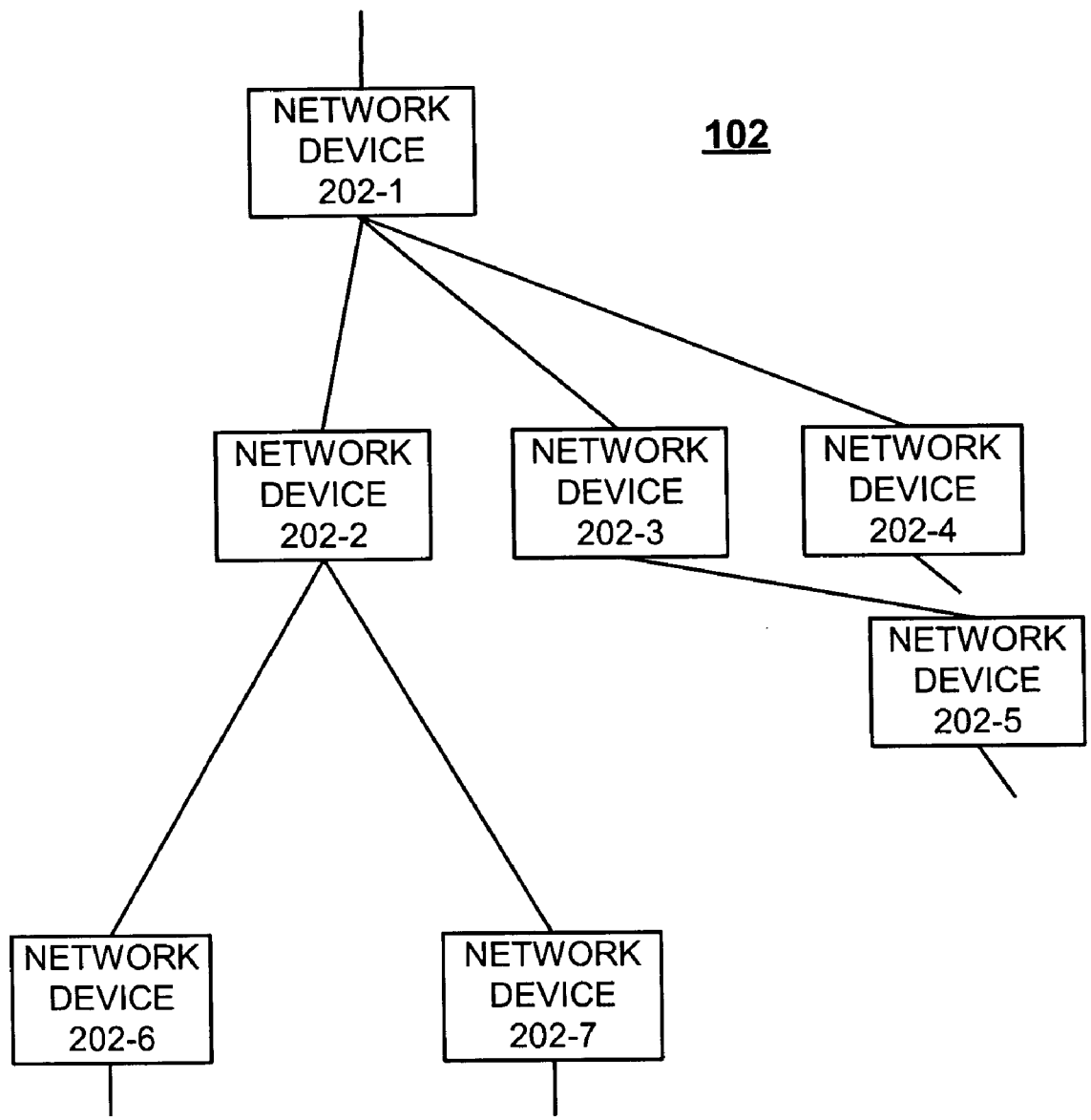
FIG. 2 illustrates a portion of a network shown in FIG. 1.

FIG. 2 illustrates a portion of network 102. Network 102 may include a number of network devices 202-1 through 202-7 (hereinafter collectively referred to as network devices 202). Network 102 may include additional or fewer network devices 202 than shown in FIG. 2. Each network device 202 may have connections with one or more other network devices, such as, for example, one or more routers or network nodes.

Figure 3:
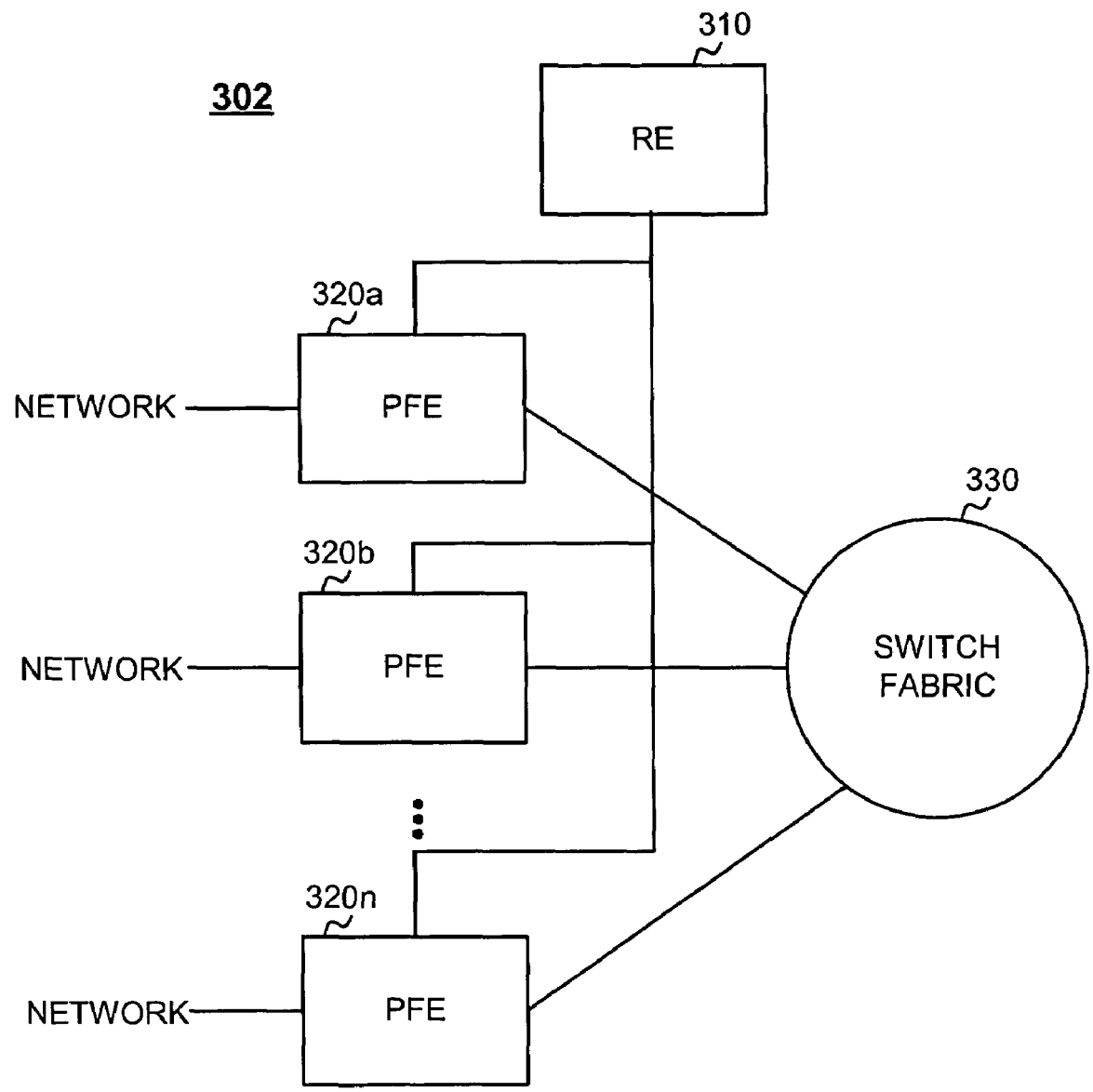
FIG. 3 is a functional block diagram of an exemplary network device of FIG. 2.

FIG. 3 is a functional block diagram of an exemplary network device consistent with the principles of the invention. In this particular implementation, the network device takes the form of a router 302, which may be used to implement one or more network devices 202. Router 302 may receive one or more packet streams from a physical link, process the stream(s) to determine destination information, and transmit the stream(s) on one or more links in accordance with the destination information.

Router 302 may include a routing engine (RE) 310 and multiple packet forwarding engines (PFEs) 320a, 320b, ... 320n (collectively, "PFEs 320") interconnected via a switch fabric 330. Switch fabric 330 may include one or more switching planes to facilitate communication between two or more of PFEs 320. In an implementation consistent with the principles of the invention, each of the switching planes includes a single or multi-stage switch of crossbar elements.

RE 310 may perform high level management functions for router 302. For example, RE 310 may communicate with other networks and systems connected to router 302 to exchange information regarding network topology. RE 310 may create routing tables based on network topology information, may create forwarding tables based on the routing tables, and may send the forwarding tables to PFEs 320. PFEs 320 may use the forwarding tables to perform route lookups for incoming packets. RE 310 may also perform other general control and monitoring functions for router 302.

Each of PFEs 320 connects to RE 310 and switch fabric 330. PFEs 320 may receive and send packets on physical links connected to a network, such as network 102. Each of the physical links may include one or more logical interfaces, such as virtual circuits or virtual paths, which may include a group of virtual circuits. Each of PFEs 320 may include a hierarchical scheduler for forwarding, on the one or more logical interfaces, received traffic according to a priority established for a class of traffic. Each physical link could be one of many types of transport media, such as optical fiber or Ethernet cable. The packets on the physical link may be formatted according to one of several protocols, such as Ethernet.

Simple Shared Shaping

Figure 4:
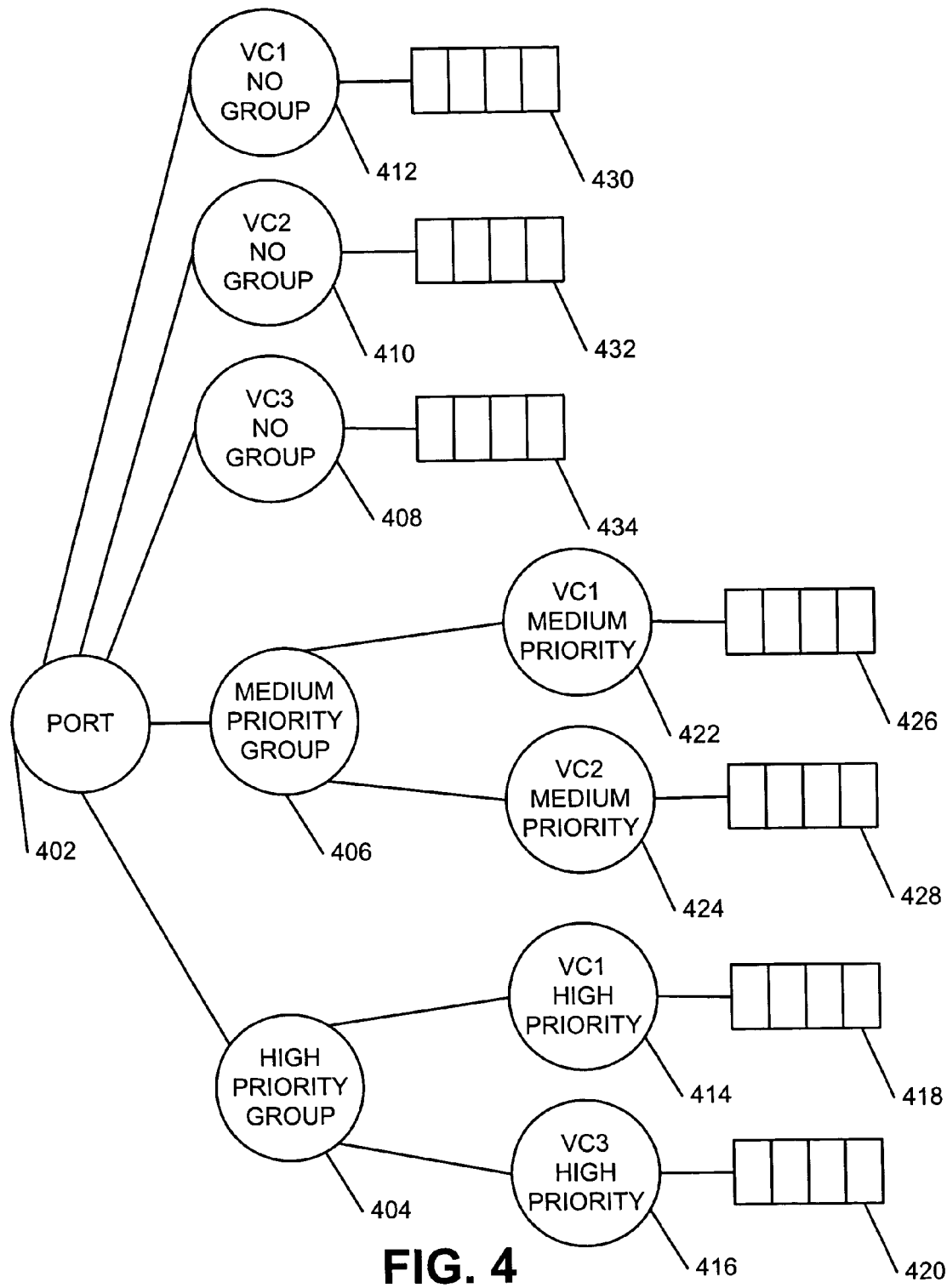
FIG. 4 illustrates an exemplary hierarchical scheduler upon which simple shared shaping may be implemented consistent with the principles of the invention.

FIG. 4 illustrates operation of simple shared shaping that may be implemented on top of a hierarchical scheduler, in network device 202, consistent with principles of the invention. The exemplary hierarchical scheduler of FIG. 4 includes a physical port 402, a high priority group scheduler node 404, a medium priority group scheduler node 406, a virtual circuit (VC) 3 no group scheduler node 408, a VC2 no group scheduler node 410, a VC1 no group scheduler node 412, a VC1 high priority scheduler node 414, a VC3 high priority scheduler node 416, a VC1 high priority queue 418, a VC3 high priority queue 420, a VC1 medium priority scheduler node 422, a VC2 medium priority scheduler node 424, a VC1 medium priority queue 426, a VC2 medium priority queue 428, a VC1 low or no priority queue 430, a VC2 low or no priority queue 432, and a VC3 low or no priority queue 434.

In this example, network device 202 may receive network traffic via physical port 402. Network device 202 may then forward traffic from port 402 according to a priority that may be associated with the traffic. For example, voice traffic may be assigned a strict or highest priority, video traffic may be assigned a medium priority, and other traffic, such as data traffic for VC1, VC2, and VC3 may be assigned a low priority or no priority. Thus, network device 202 may forward voice traffic from port 402 to high priority group scheduler node 404, video traffic from port 402 to medium priority group scheduler node 406, and other traffic, such as data traffic, from port 402 to low priority or no priority scheduler nodes, such as VC1 (no group) scheduler node 412, VC2 (no group) scheduler node 410, or VC3 (no group) scheduler node 408.

High priority group scheduler node 404 may then forward traffic to a VC associated with the traffic. In this example, only VC1 and VC3 may carry high priority traffic. High priority group scheduler node 404 may forward traffic received from port 402 to VC1 high priority traffic queue 418 or VC3 high priority traffic queue 420 via VC1 high priority scheduler node 414 or VC3 high priority schedule node 416, respectively.

In this example, only VC1 and VC2 carry medium priority traffic. Medium priority group scheduler node 406 may forward medium priority traffic to VC1 or VC2 medium priority traffic queues 426, 428 via VC1 or VC2 medium priority scheduler nodes 422, 424, respectively.

In this example, network device 202 may forward low or no priority traffic for VC1, VC2 or VC3 from port 402 to low priority queues 430, 432, 434 via VC1-VC3 (no group) scheduler nodes 412, 410, 408, respectively.

In at least some implementations consistent with the principles of the invention, only low (or no) priority queues may be actively controlled by simple shared shaping. A simple shared shaper configured on low priority scheduler node 412 for subscriber interface VC1 may track, for example, an enqueue rate for VC1 high priority queue 418 and VC1 medium priority queue 426. The simple shared shaper may then shape the VC1 scheduler node 412 to have a rate equal to:

configured shared shaping rate for subscriber interface VC1−(VC1 high priority enqueue rate+ VC1 medium priority enqueue rate).

In this example, the constituents of the VC1 subscriber interface are VC1 high priority traffic, VC1 medium priority traffic, and VC1 low priority traffic.

A simple shared shaper configured on low priority scheduler node 410 for VC2 may track, for example, an enqueue rate for VC2 medium priority queue 424. The simple shared shaper may shape the VC2 scheduler node 410 to have a rate equal to:

configured shared shaping rate for subscriber interface VC2−(VC2 medium priority enqueue rate).

In this example, the constituents of the VC2 subscriber interface are VC2 medium priority traffic and VC2 low priority traffic. There is no VC2 high priority traffic.

A simple shared shaper configured on low priority scheduler node 408 for VC3 may track, for example, an enqueue rate for VC3 high priority queue 420. The simple shared shaper may shape the VC3 scheduler node 408 to have a rate equal to:

> configured shared shaping rate for subscriber interface VC3−(VC3 high priority enqueue rate).

In this example, the constituents of the VC3 subscriber interface are VC3 high priority traffic and VC3 low priority traffic. There is no VC3 medium priority traffic.

Figure 5:
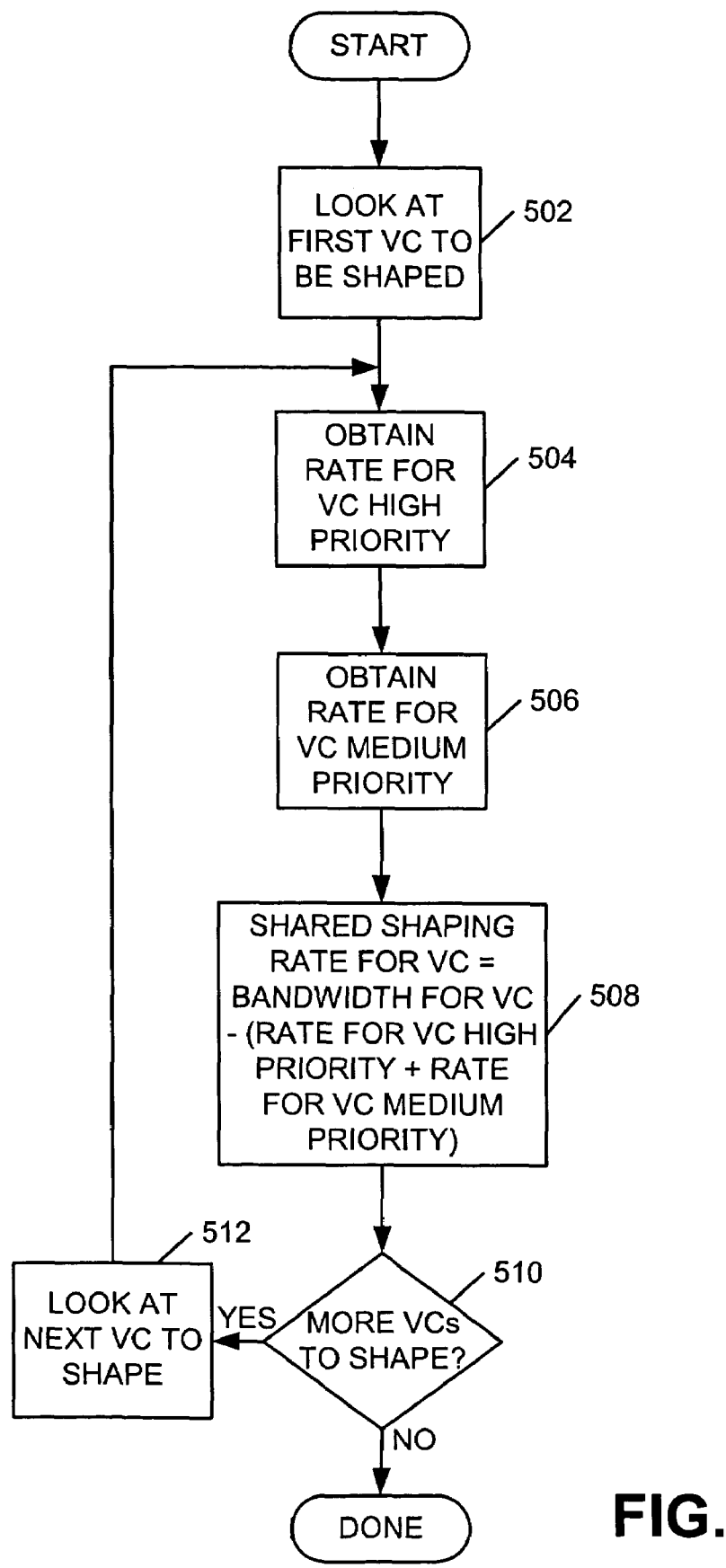
FIG. 5 is a flowchart that illustrates exemplary simple shared shaping processing consistent with principles of the invention.

FIG. 5 is a flowchart that illustrates exemplary processing for simple shared shaping within network device 202. Network device 202 may monitor the enqueue rate of high and medium priority queues. In one implementation, a processor may monitor the enqueue rate of high and medium priority queues and may provide the measured enqueue rates once per second as a rate update. Other time intervals may be used instead of one second. When the rate update is available, network device 202 may perform the process of FIG. 5.

First, network device 202 may prepare to determine the shaping rate of a first low or no priority queue, corresponding to a subscriber interface or VC to be shaped (act 502). Network device 202 may then obtain the updated enqueue rate for a high priority queue corresponding to the VC, if one exists (act 504). Next, network device 202 may obtain the updated enqueue rate for a medium priority queue corresponding to the VC, if one exists (act 506). Network device 202 may then determine the shared shaping rate for the VC by subtracting the sum of the enqueue rate of the high priority queue for the VC and the enqueue rate of the medium priority queue for the VC from the allowed bandwidth or rate cap for the VC (act 508). Thus, the low or no priority queue for the VC may be allowed to use any unused bandwidth capacity configured for the VC. Network device 202 may then determine whether any additional subscriber interfaces or VCs are to be shaped. If no more VCs are to be shaped, then the process is completed. Otherwise, network device 202 may prepare to shape the next VC (act 512). Network device 202 may then repeat acts 504 through 510.

Figure 6:
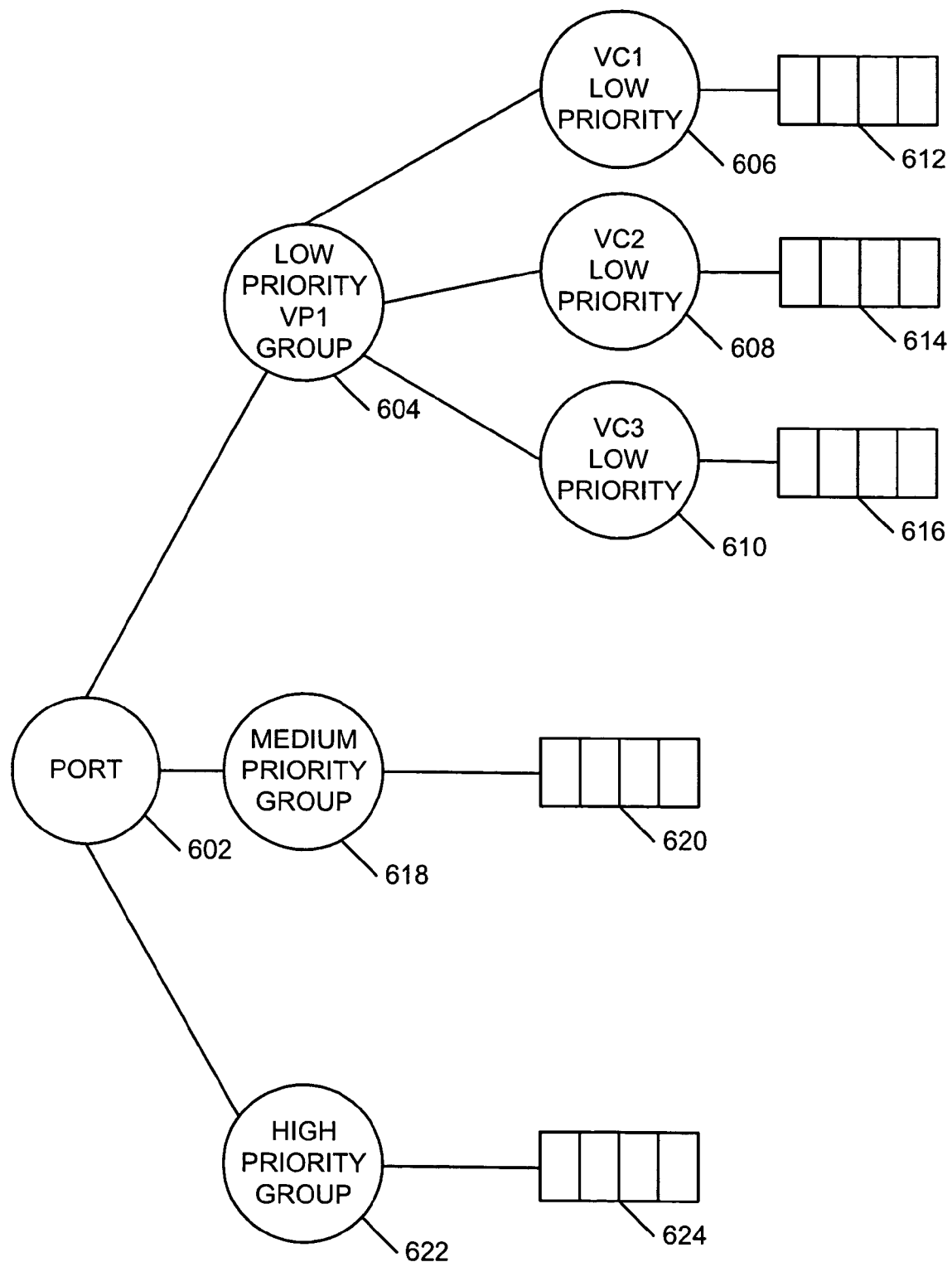
FIG. 6 illustrates a second exemplary hierarchical scheduler upon which simple shared shaping may be implemented consistent with the principles of the invention.

FIG. 6 illustrates operation of simple shared shaping that may be implemented on top of another hierarchical scheduler, in network device 202, consistent with principles of the invention. The exemplary hierarchical scheduler of FIG. 6 includes a physical port 602, a low priority VP1 group scheduler node 604, a medium priority group scheduler node 618, a high priority group scheduler node 622, a VC1 low priority scheduler node 606, a VC2 low priority scheduler node 608, a VC3 low priority scheduler node 610, a VC1 low priority queue 612, a VC2 low priority queue 614, a VC3 low priority queue 616, a medium priority queue 620, and a high priority queue 624.

A VP is a subscriber interface that includes a group of VCs. In this example, network device 202 forwards traffic from port 602 according to priority. Network device 202 may forward low, or no priority data, such as, for example, data traffic, from port 602 to low priority VP1 group scheduler node 604, which may then forward the traffic to one of three low priority scheduler nodes 606, 608, 610, depending on whether the traffic is for VC1, VC2, or VC3, respectively. Thus, VP1 includes traffic for VC1, VC2, and VC3. Each of scheduler nodes 606, 608, 610 may then forward the traffic to an associated queue 612, 614, 616, respectively, for transmission through network 102.

Network device 202 may forward medium priority traffic, such as, for example, video traffic, from port 602 to medium priority group scheduler node 618. Scheduler node 618 may then forward the traffic to queue 620 for holding medium priority VP1 traffic for transmission.

Network device 202 may forward high or strict priority traffic, such as, for example, voice traffic, from port 602 to high priority group scheduler node 622. Scheduler node 622 may then forward the traffic to queue 624 for holding high priority VP1 traffic for transmission.

As mentioned previously, in at least some implementations consistent with the principles of the invention, only low (or no) priority queues may be actively controlled by simple shared shaping. A simple shared shaper configured on low priority VP1 group scheduler node 604 for VP1 may track, for example, an enqueue rate for VP1 high priority queue 624 and VP1 medium priority queue 620. The simple shared shaper may then shape VP1 group scheduler node 604 to have a rate equal to:

> configured shared shaping rate for interface VP1−
> (VP1 high priority enqueue rate+VP1 medium
> priority enqueue rate).

In this example, the constituents of the VP1 interface are VP1 high priority traffic, VP1 medium priority traffic, and VP1 low priority traffic.

Figure 7:
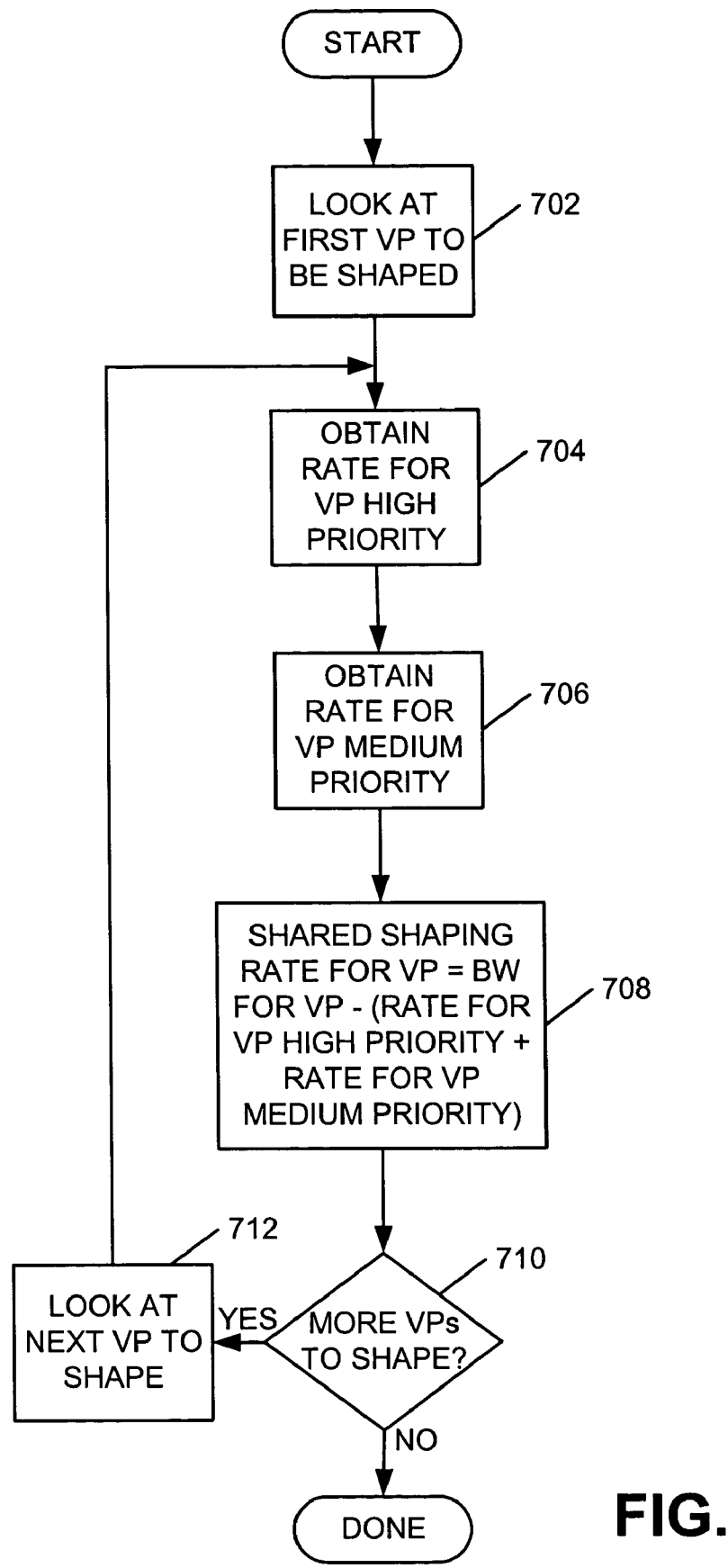
FIG. 7 is a flowchart that illustrates processing of another exemplary implementation of simple shared shaping processing consistent with the principles of the invention.

The flowchart of FIG. 7 explains the process of shared shaping for VPs. In some implementations of simple shared shaping in network device 202, either VCs or VPs may be shaped, but not both. Using the example of FIG. 6 with reference to FIG. 7, network device 202 may prepare to shape bandwidth for VP1, the only VP in this example (act 702). Rate updates for VP1 may be available periodically, such as once per second, or another time period. Network device 202 may obtain the latest enqueue rate for VP1's high priority queue 624 (act 704). Next, network device 202 may obtain the latest enqueue rate for VP1's medium priority queue 620 (act 706). Network device 202 may then determine a shared shaping rate or bandwidth that may be used for low priority VP1 traffic by subtracting the sum of enqueue rates for constituents high and medium priority queues 624, 620, respectively, from bandwidth permitted for subscriber interface VP1 (act 708). Thus, in this example, VC1, VC2, and VC3 share the calculated shared shaping rate. Network device 202 may then determine whether there are additional VPs to shape (act 710). In this example, there are no other VPs, therefore, the process is completed until the next time period.

Compound Shared Shaping

Figure 8:
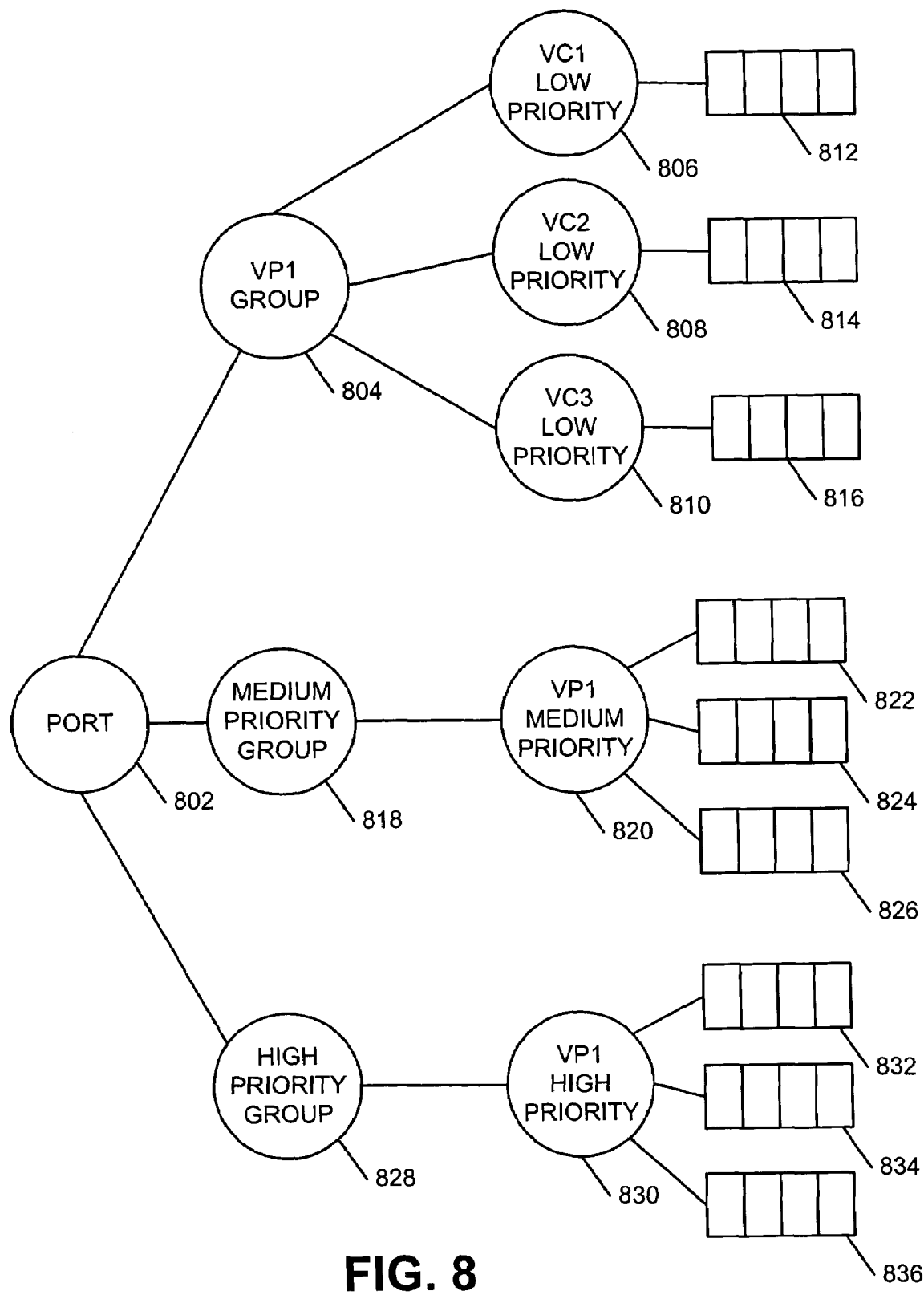
FIG. 8 illustrates an exemplary hierarchical scheduler upon which compound shared shaping may be implemented consistent with the principles of the invention.

FIG. 8 illustrates operation of compound shared shaping that may be implemented on top of a hierarchical scheduler in network device 202 consistent with the principles of the invention. The exemplary hierarchical scheduler of FIG. 8 includes a physical port 802, a VP1 group scheduler node 804, a VC1 low priority scheduler node 806, a VC2 low priority scheduler node 808, a VC3 low priority scheduler node 810, a VC1 low priority queue 812, a VC2 low priority queue 814, a VC3 low priority queue 816, a medium priority group scheduler node 818, a VP1 medium priority scheduler node 820, a VC1 medium priority queue 822, a VC2 medium priority queue 824, a VC3 medium priority queue 826, a high priority group scheduler node 828, a VP1 high priority scheduler node 830, a VC1 high priority queue 832, a VC2 high priority queue 834, and a VC3 high priority queue 836.

In this example, network device 202 may receive network traffic via physical port 802. Network device 202 may then forward traffic from port 802 according to a priority that may be associated with a class of traffic. For example, voice traffic may be assigned a strict or highest priority, video traffic may be assigned medium priority, and other traffic, such as data traffic for VC1, VC2, and VC3 may be assigned a low priority. Thus, network device 202 may forward voice traffic from port 802 to high priority group scheduler node 828, video traffic from port 802 to medium priority group scheduler node 818, and other traffic, such as data traffic, from port 802 to low priority or no priority scheduler nodes, such as VP1 group scheduler node 804.

Network device 202 may forward VP1 low priority traffic to VC1 low priority queue 812, VC2 low priority queue 814, or VC3 low priority queue 810 from VC1 low priority scheduler node 806, VC2 low priority scheduler node 808, and VC3 low priority scheduler node 810, respectively. Network device 202 may forward traffic from medium priority group scheduler node 818 to VC1 medium priority queue 822, VC2 medium priority queue 824, or VC3 medium priority queue 826 through VP1 medium priority scheduler node 820. Similarly, network device 202 may forward traffic from high priority group scheduler node 828 to VC1 high priority queue 832, VC2 high priority queue 834, or VC3 high priority queue 836 through VP1 high priority scheduler node 836.

Compound shared shaping may provide the ability to shape VPs and/or VCs. For example, scheduler node 804 may be permitted to use unused bandwidth from scheduler nodes 820 and 830 for VP1. Simultaneously, any of scheduler nodes 806, 808, and 810, may be permitted to use unused bandwidth of queues 832, 834, 836, respectively, and 822, 824, and 826, respectively. That is, VP1 scheduler node 804, which is for low priority VP1 traffic, may be permitted to use the unused bandwidth of VP1 high and medium priority traffic and VC1, VC2 and VC3 may use the unused bandwidth of high and medium priority traffic for VC1, VC2 and VC3, respectively, for low priority traffic.

Figure 9:
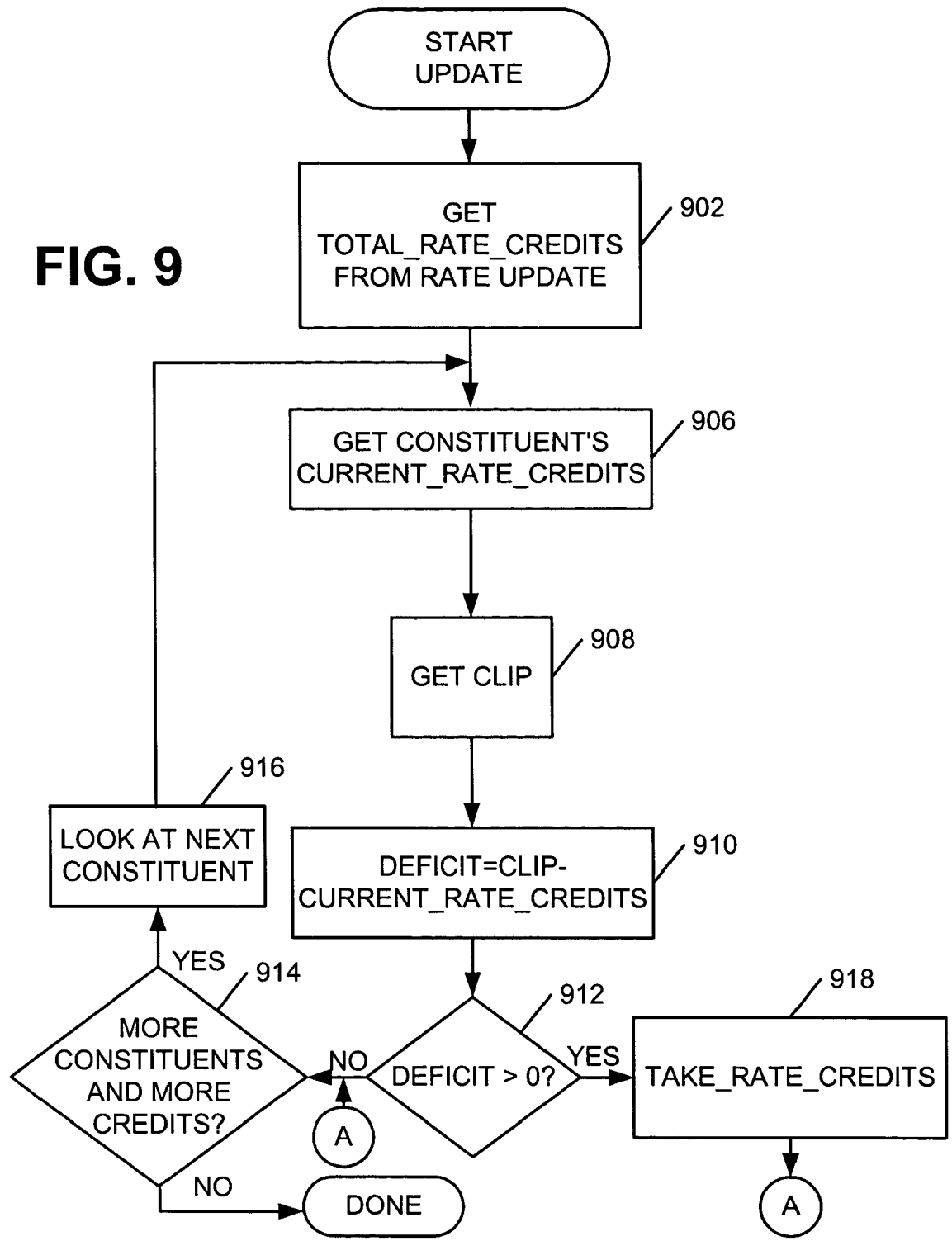
FIGS. 9, 10, and 11 are flowcharts that illustrate exemplary compound shared shaping processing consistent with the principles of the invention.

FIG. 9 is a flowchart of an exemplary compound shared shaping process that may be implemented in network device 202 consistent with the principles of the invention. In implementations of compound shared shaping, a dequeueing rate of dequeueing from queues or scheduling nodes may be monitored and updated periodically, such as, for example, every 8 milliseconds or any other useful time period. Hardware, such as an Application Specific Integrated Circuit (ASIC) or a Field Programmable Gate Array (FPGA) may perform the monitoring and updating. Alternatively, monitoring and updating may be performed by one or more processors executing program instructions.

In implementations that use compound shared shaping, total rate credits may be determined by subtracting the dequeue rate of each constituent of the subscriber interface from a rate limit for the subscriber interface. Updated total rate credits may be stored in scheduler descriptors, which are storage areas associated with scheduler nodes or queues.

Network device 202 may perform compound shared shaping on a priority basis or a weighted basis, as will be explained below. The processing described in the flowchart of FIG. 9 will be described with reference to the exemplary hierarchical scheduler of FIG. 8 for strict shared shaping of subscriber interface VP1 to a particular shared rate. In this implementation, compound shared shaping may first be performed for all priority-based constituents, followed by all weight-based constituents. Of the priority-based constituents, compound shared shaping is performed for higher priority constituents before lower priority constituents.

Network device 202 may begin by obtaining, from a latest rate update, the total shared rate credits for a subscriber interface, which in this case is VP1 (act 902). Next, network device 202 may obtain the constituent's current rate credits for the first constituent (VP1 high priority scheduler node 830) to be shaped (act 906). The current rate credits for a constituent is a value representing a number of units (for example, bytes or another unit) that the constituent may send during a reporting interval, for example, 8 milliseconds. Network device 202 may obtain the constituent's current rate credits from the scheduler node's scheduler descriptor. Network device 202 may then obtain the constituent's clip from the scheduler descriptor. The clip is a configured size, which may be in bytes or any other convenient unit, such that network device 202 may not forward traffic until at least a size of the configured clip has accumulated. Network device 202 may then determine whether the constituent has a rate deficit by subtracting current rate credits from the clip (act 910). If the deficit is not greater than 0, then network device 202 may determine whether there are more constituents and more total rate credits (act 914). If there are more constituents, for example, VP1 medium priority scheduler node 820, network device 202 may prepare to update rate credits for the next constituent (act 916).

If network device 202 determines that deficit is greater than 0, then network device 202 may take rate credit for the constituent from total rate credits for the subscriber interface (VP1 for this example) (act 918) and may determine whether there are more constituents and more credits (act 914). After updating rate credits for a constituent (scheduler node 820, for this example), network device 202 may then proceed to update rate credits for the next constituent of the subscriber interface (VP1 group scheduler node 804), if more total rate credits for the subscriber interface (VP1) exist.

Figure 10:
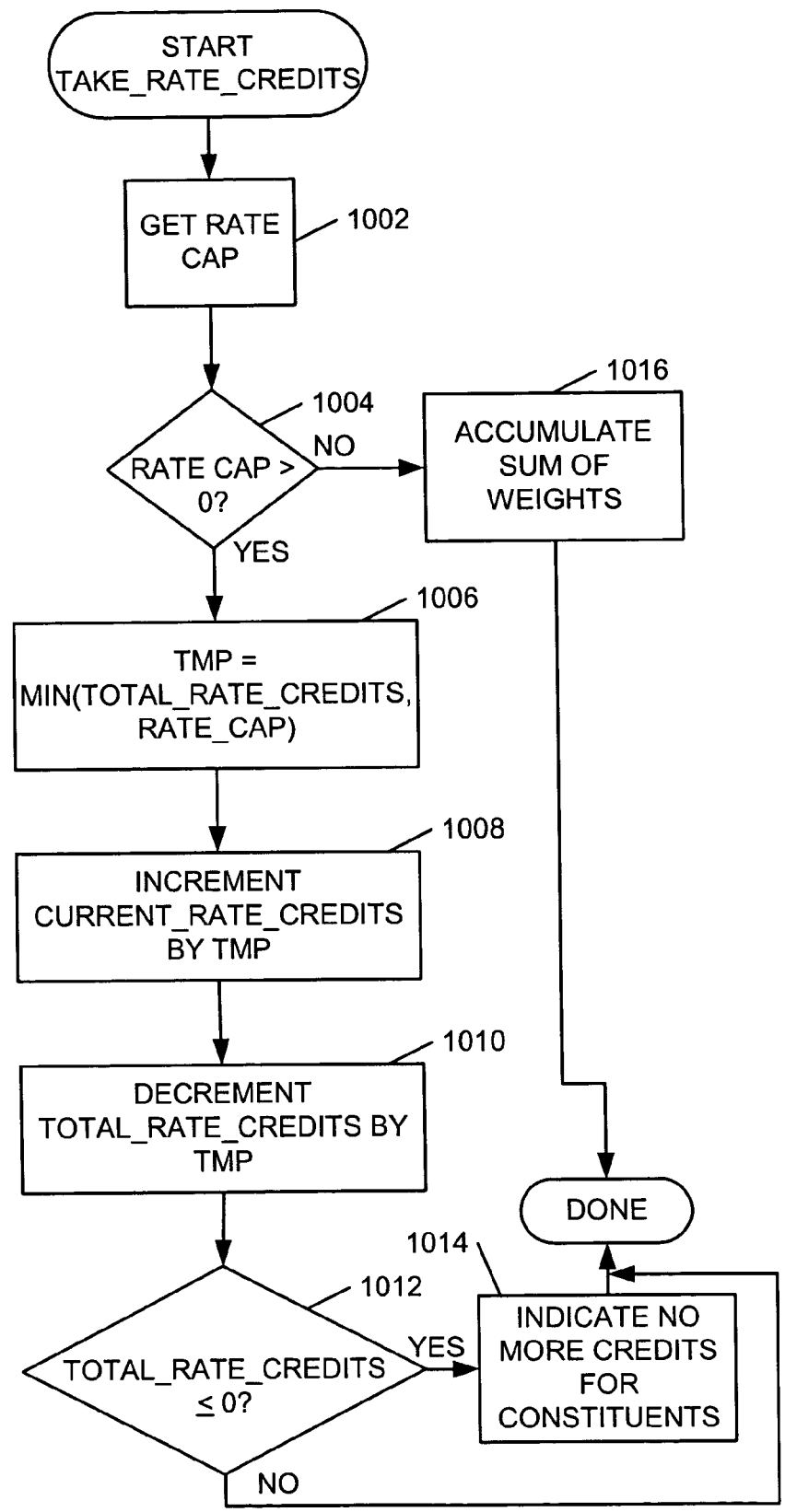

FIG. 10 is a flowchart that explain exemplary processing for take rate credits (act 918: FIG. 9). First, network device 202 may get a rate cap for the current constituent from the constituent's scheduler descriptor (act 1002). In this implementation of compound shared shaping, network device 202 may perform priority shared shaping if the rate cap is greater than 0 or weighted shared shaping if the rate cap is not greater than 0. In alternative implementations, other indicators of weighted shared shaping may be used, such as, for example, a separate weighted shared shaping flag, or a negative rate cap. If network device 202 determines that rate cap is greater than 0 (act 1004), then network device 202 may determine tmp, which is a minimum of total rate credits for the subscriber interface and the rate cap for the constituent (act 1006). Tmp is an amount of rate or bandwidth that network device 202 may provide to the constituent. Therefore, tmp cannot be more than the rate cap. Network device 202 may then increment the constituent's current rate credits by tmp (act 1008) and may decrement total rate credits for the subscriber interface by tmp (act 1010). If total rate credits is less than or equal to 0, network device 202 may indicate that no more credits exist, such that the update process of FIG. 9 (act 914) determines that the process is completed for the subscriber interface.

If network device 202 determines that rate cap is not greater than 0 (act 1004), then network device 202 may accumulate the sum of weights for all weighted constituents sharing rate for a subscriber interface (act 1016). In one implementation, weights may range from 1 to 31. Additional, fewer, or other weights may be used in other implementations.

Figure 11:
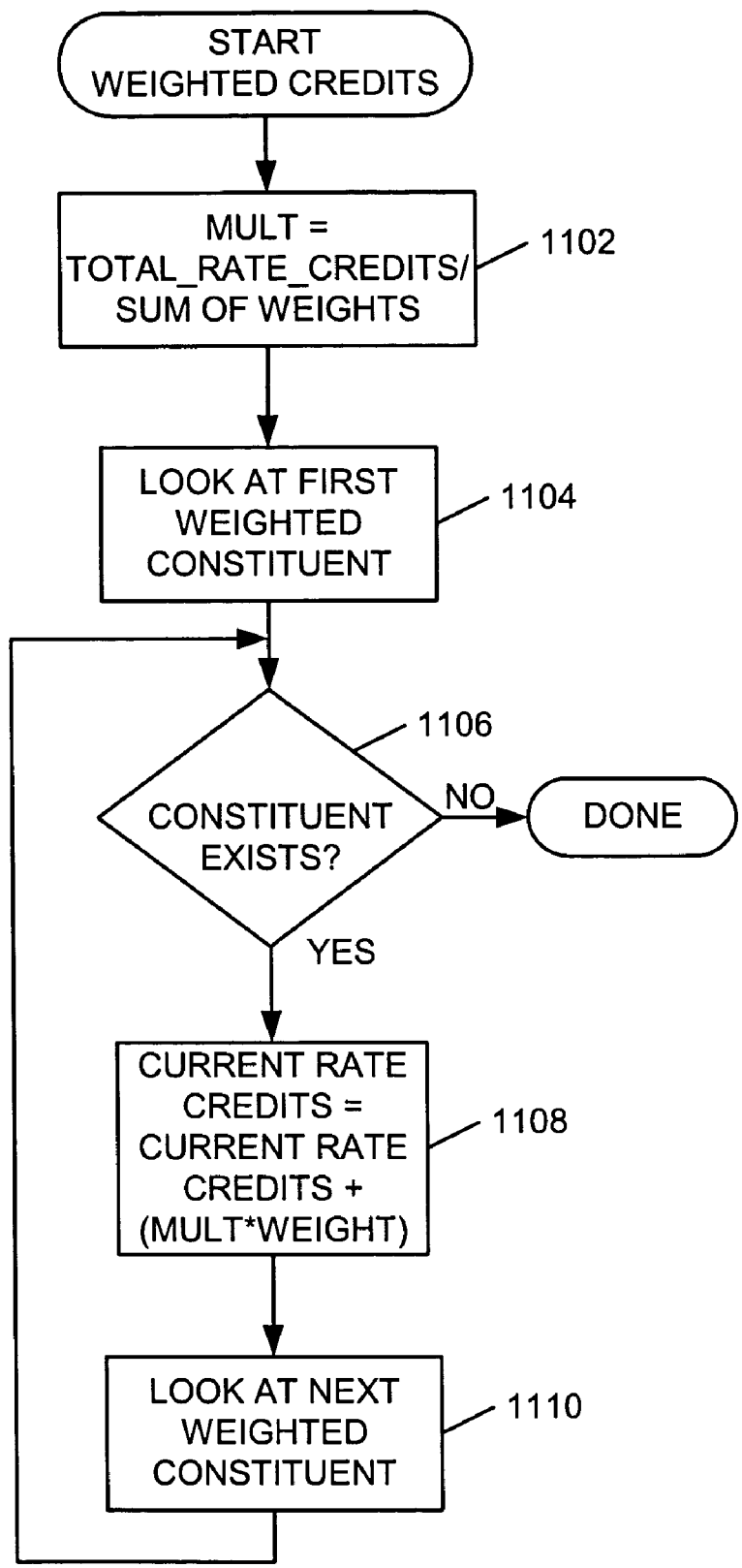

FIG. 11 is a flowchart of an exemplary process for sharing rate or bandwidth among weighted constituents of a subscriber interface. Network device 202 may begin by calculating mult by dividing the available total rate credits by the sum of weights previously determined at act 1016 (act 1102). In some implementations, network device 202 may perform the division of act 1102 by using a table lookup in order to keep processing time to a minimum. Next, network device 202 may prepare to process the first weighted constituent (act 1104). If a weighted constituent does not exist (act 1106), then the process is completed. Otherwise, network device 202 may obtain the constituent's current rate credits and weight from the constituent's scheduler descriptor and may increment the constituent's current rate credits by the product of mult with the weight of the constituent (act 1108). Network device 202 may then prepare to process the next weighted constituent for the subscriber interface (act 1110). Network device 202 may then repeat acts 1106 through 1110 until no weighted constituents remain to be processed.

Figure 12:
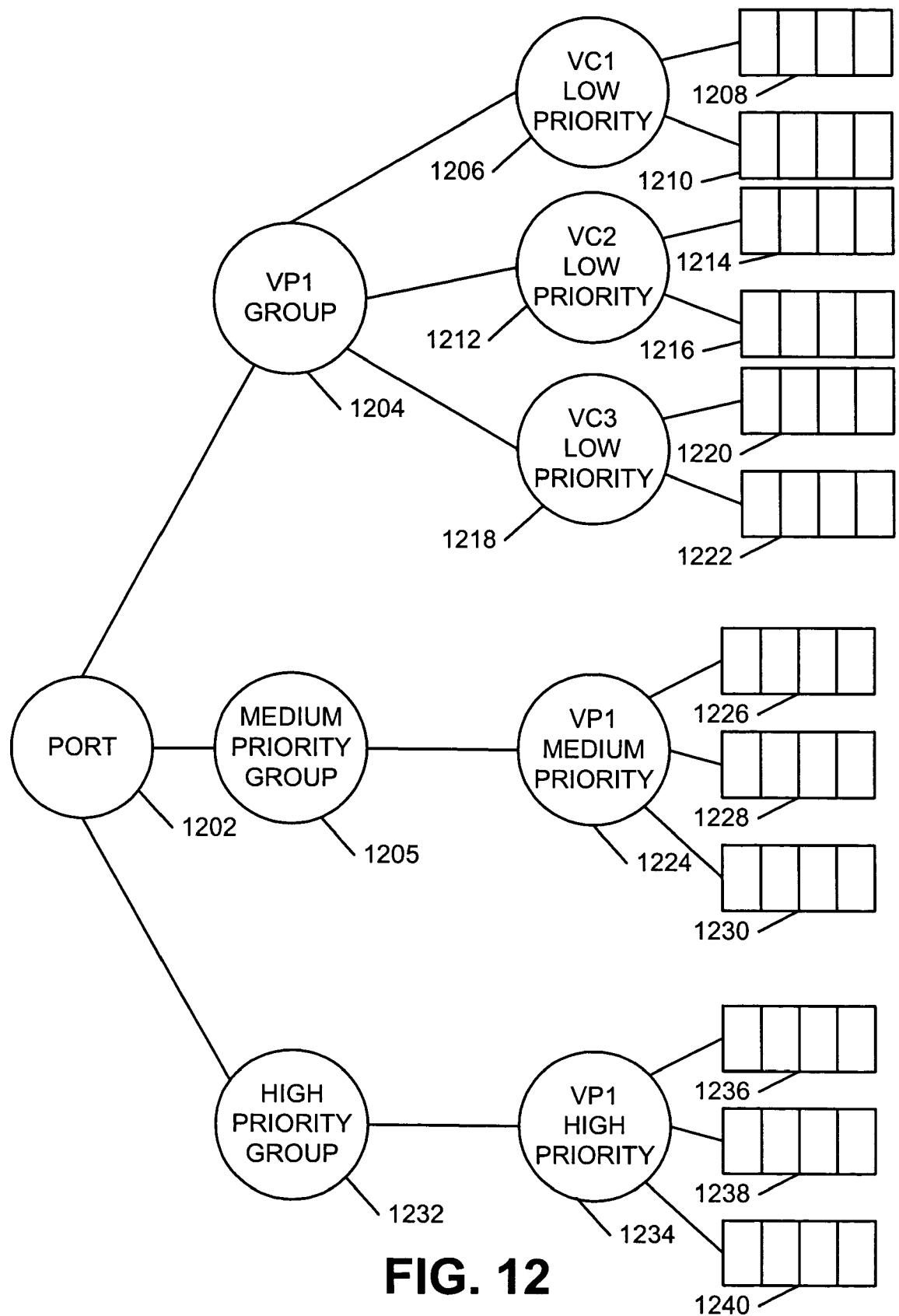
FIG. 12 illustrates a second exemplary hierarchical scheduler upon which compound shared shaping may be implemented consistent with the principles of the invention.

FIG. 12 illustrates an exemplary hierarchical scheduler configuration within network device 202 in which weighted shared shaping may be used. The exemplary hierarchical scheduler of FIG. 12 includes a physical port 1202, a VP1 group scheduler node 1204, a VC1 low priority scheduler node 1206, a VC1 low priority data queue 1208, a VC1 low priority data2 queue 1210, a VC2 low priority scheduler node 1212, a VC2 low priority data queue 1214, a VC2 low priority data2 queue 1216, a VC3 low priority scheduler node 1218, a VC3 low priority data queue 1220, a VC3 low priority data2 queue 1222, a medium priority group scheduler node 1205, a VP1 medium priority scheduler node 1224, a VC1 video traffic queue 1226, a VC2 video traffic queue 1228, a VC3 video traffic queue 1230, a high priority group scheduler node 1232, a VP1 medium priority scheduler node 1234, a VC1 voice queue 1236, a VC2 voice queue 1238, and a VC3 voice queue 1240.

In this example, traffic may be one of several traffic classes, voice, video, data, and a new data class, data2. Traffic may arrive via physical port 1202. Network device 202 may forward low priority VP1 traffic from port 1202 to VP1 group scheduler node 1204. In this example, VP1 includes traffic for VC1, VC2 and VC3. VP1 group scheduler 1204 may then forward traffic to VC1 low priority scheduler node 1206, VC2 low priority scheduler node 1212 or VC3 low priority scheduler node 1218. VC1 low priority scheduler 1206 may then forward VC1 data traffic to queue 1208 and VC1 data2 traffic to queue 1210. VC2 low priority scheduler node 1212 may forward data traffic to queue 1214 and data2 traffic to queue 1216. VC3 low priority scheduler node 1218 may forward data traffic to queue 1220 and data2 traffic to queue 1222.

Medium priority group scheduler node 1205 may forward VP1 traffic to VP1 medium priority scheduler node 1224. VP1 medium priority scheduler node 1224 may then forward VC1 video traffic to queue 1226, VC2 video traffic queue 1228, and VC3 video traffic to queue 1230.

High priority group scheduler node 1232 may forward VP1 traffic to VP1 high priority scheduler node 1234. VP1 high priority scheduler node 1234 may then forward VC1 voice traffic to queue 1236, VC2 voice traffic queue 1238, and VC3 voice traffic queue 1240.

Assuming that voice and video traffic constituents are defined as strict priority constituents, first, network device 202 may allocate rate credits or bandwidth to constituent, VP1 high priority traffic, up to the constituent's rate cap, and then may allocate rate credits or bandwidth to constituent, VP1 medium priority traffic, up to the constituent's rate cap. Remaining bandwidth may be allocated to low priority traffic.

In this example, the low priority constituents may be defined as VC1 data, VC1 data2, VC2 data, VC2 data2, VC3 data, and VC3 data2. The low priority constituents may be assigned weights. For example, VC1 data may have a weight of 10, VC1 data2 may be have a weight of 20, VC2 data may have a weight of 10, VC2 data2 may have a weight of 20, VC3 data may have a weight of 10 and VC3 data2 may have a weight of 20.

For the sake of this example, assume that the shared shaping rate for the group of constituents of each of VC1, VC2, and VC3 is 1 megabit per second. If the rate is updated periodically at, for example, every 8 milliseconds, then the total rate credits for the VC1 subscriber interface is 8,000 bits every 8 milliseconds. In this example, assume that voice may consume 500 rate credits at any given moment and video may consume 1000 rate credits at any given moment, leaving 6500 rate credits to subdivide between data and data2 constituents With reference to FIG. 11, network device 202 may calculate mult to be available total rate credits divided by the sum of weights, which for VC1 is (6,500)/(10+20), which is approximately 216 (act 1102). Network device 202 may then prepare to determine the weighted credits of the first weighted constituent, VC1 data, (act 1104). Network device 202 may determine whether the weighted constituent exists (act 1106). For this example, the result is, "Yes." Network device 202 may then calculate rate credits for the constituent to be current rate credits+(mult*weight), which is current weight credit+(approximately) 2160 credits (act 1108). Network device 202 may then prepare to process the next weighted constituent, VC1 data2, with a weight of 20. Network device 202 determines that this constituent exists (act 1106) and determines that mult*weight, which is about 4320, is to be added to the constituent's current weight (act 1108). Next, network device 202 prepares to process the next weighted constituent of VC1 (act 1110). Network device 202 may determine that the constituent does not exist (act 1106) and then processing may end.

Because, in this example, the weights for VC2 and VC3 data and data2 traffic are the same as VC1 data and data2 traffic, the calculations for VC2 and VC3 are the same as for VC1, using the assumption that voice may consume 500 rate credits at any given moment and video may consume 1000 rate credits at any given moment, leaving 6500 rate credits to subdivide between data and data2. Thus, VC2 data traffic and VC3 data traffic may receive an additional 2160 rate credits and 4320 rate credits, respectively, and VC3 data and VC3 data2 traffic may receive an additional 2160 rate credits and 4320 rate credits, respectively.

Variations

Although the above examples use three priorities, any number of priorities may be used in various implementations. In implementations consistent with the principles of the invention, simple shared shaping may first monitor bandwidth use of higher priority constituents and may allocate remaining bandwidth to a lowest priority scheduler node or queue. In some implementations, a group of simple shared shaping constituents may all be VCs or VPs.

In implementations of compound shared shaping consistent with the principles of the invention, compound shared shaping constituents may be VC constituents or VP constituents or both. Some constituents may be strict priority constituents and other constituents may be weighted constituents.

The above examples describe an enqueue rate being used as a rate measurement for simple shared shaping and a dequeue rate being used as a rate measurement for compound shared shaping. In other implementations of simple shared shaping a dequeue rate may be used as a rate measurement and in other implementations of compound shared shaping an enqueue rate may be used as a rate measurement.

An implementation consistent with the principles of the invention may use one or more Ethernet networks that may conform to the IEEE 802.1Q standard, which describes an extension to the Ethernet header that may include a tag to identify a virtual local area network (VLAN). A VLAN is a logical group of devices. VLANs provide a network administrator with the ability to resegment networks without physically rearranging the devices or network connections. In such an implementation, the tag may identify a particular VLAN that may correspond to either a VP or a VC from the previously described examples. For example, FIG. 13 illustrates an implementation consistent with the principles of the invention that uses Ethernet VLANs.

Figure 13:
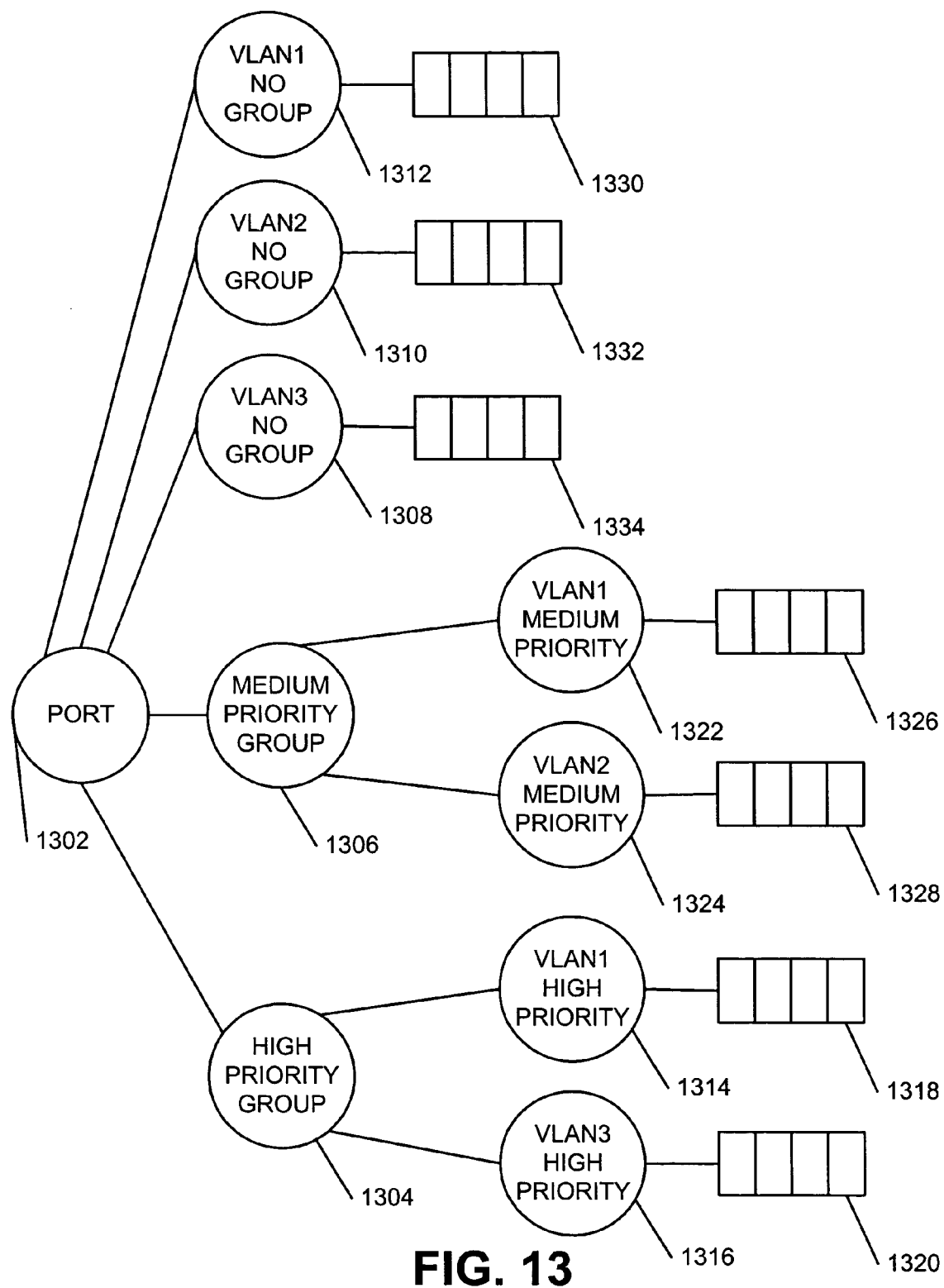
FIG. 13 illustrates an exemplary hierarchical scheduler upon which simple shared shaping with virtual local area networks (VLANs) may be implemented consistent with the principles of the invention.

FIG. 13 corresponds to FIG. 4 having virtual circuits replaced with VLANs. FIG. 13 illustrates operation of simple shared shaping that may be implemented on top of a hierarchical scheduler in network device 202, consistent with principles of the invention. The exemplary hierarchical scheduler of FIG. 13 includes a physical Ethernet port 1302, a high priority group scheduler node 1304, a medium priority group scheduler node 1306, a VLAN3 no group scheduler node 1308, a VLAN2 no group scheduler node 1310, a VLAN1 no group scheduler node 1312, a VLAN1 high priority scheduler node 1314, a VLAN3 high priority scheduler node 1316, a VLAN1 high priority queue 1318, a VLAN3 high priority queue 1320, a VLAN1 medium priority scheduler node 1322, a VLAN2 medium priority scheduler node 1324, a VLAN1 medium priority queue 1326, a VLAN2 medium priority queue 1328, a VLAN1 low or no priority queue 1330, a VLAN2 low or no priority queue 1332, and a VLAN3 low or no priority queue 1334.

In this example, network device 202 may receive network traffic via physical Ethernet port 1302. Network device 202 may then forward traffic from port 1302 according to a priority that may be associated with the traffic. For example, voice traffic may be assigned a strict or highest priority, video traffic may be assigned a medium priority, and other traffic, such as data traffic for VLAN1, VLAN2, and VLAN3 may be assigned a low priority or no priority. Thus, network device 202 may forward voice traffic from port 1302 to high priority group scheduler node 1304, video traffic from port 1302 to medium priority group scheduler node 1306, and other traffic, such as data traffic, from port 402 to low priority or no priority scheduler nodes, such as VLAN1 (no group) scheduler node 1312, VLAN2 (no group) scheduler node 1310, or VLAN3 (no group) scheduler node 1308.

High priority group scheduler node 1304 may then forward traffic to a VLAN associated with the traffic. In this example, only VLAN1 and VLAN3 may carry high priority traffic. High priority group scheduler node 1304 may forward traffic received from port 1302 to VLAN1 high priority traffic queue 1318 or VLAN3 high priority traffic queue 1320 via VLAN1 high priority scheduler node 1314 or VLAN3 high priority schedule node 1316, respectively.

In this example, only VLAN1 and VLAN2 carry medium priority traffic. Medium priority group scheduler node 1306 may forward medium priority traffic to VLAN1 or VLAN2 medium priority traffic queues 1326, 1328 via VLAN1 or VLAN2 medium priority scheduler nodes 1322, 1324, respectively.

In this example, network device 202 may forward low or no priority traffic for VLAN1, VLAN2 or VLAN3 from port 1302 to low priority queues 1330, 1332, 1334 via VLAN1-VLAN3 (no group) scheduler nodes 1312, 1310, 1308, respectively.

The exemplary simple shared shaper may shape the VLAN1 scheduler node 1312 to have a rate equal to:

configured shared shaping rate for VLAN1−(VLAN1 high priority enqueue rate+VLAN1 medium priority enqueue rate).

In this example, the constituents of the VLAN1 interface are VLAN1 high priority traffic, VLAN1 medium priority traffic, and VLAN1 low priority traffic.

The exemplary simple shared shaper may shape the VLAN2 scheduler node 1310 to have a rate equal to:

configured shared shaping rate for interface VLAN2−(VLAN2 medium priority enqueue rate).

In this example, the constituents of the VLAN2 interface are VLAN2 medium priority traffic and VLAN2 low priority traffic. There is no VLAN2 high priority traffic.

The exemplary simple shared shaper may shape the VLAN3 scheduler node 1308 to have a rate equal to:

configured shared shaping rate for interface VLAN3−(VLAN3 high priority enqueue rate).

In this example, the constituents of the VLAN3 subscriber interface are VLAN3 high priority traffic and VLAN3 low priority traffic. There is no VLAN3 medium priority traffic.

In an alternative implementation, the exemplary simple shared shaper may use dequeue rates instead of enqueue rates.

In another implementation consistent with the principles of the invention, a stacked VLAN encapsulation may be employed. That is, two IEEE 802.1Q VLAN tags may be used, where a VP may correspond to an outer VLAN tag and a VC may correspond to an inner VLAN tag. In an alternative implementation, a VP may correspond to an inner VLAN tag and a VC may correspond to an outer VLAN tag.

Figure 14:
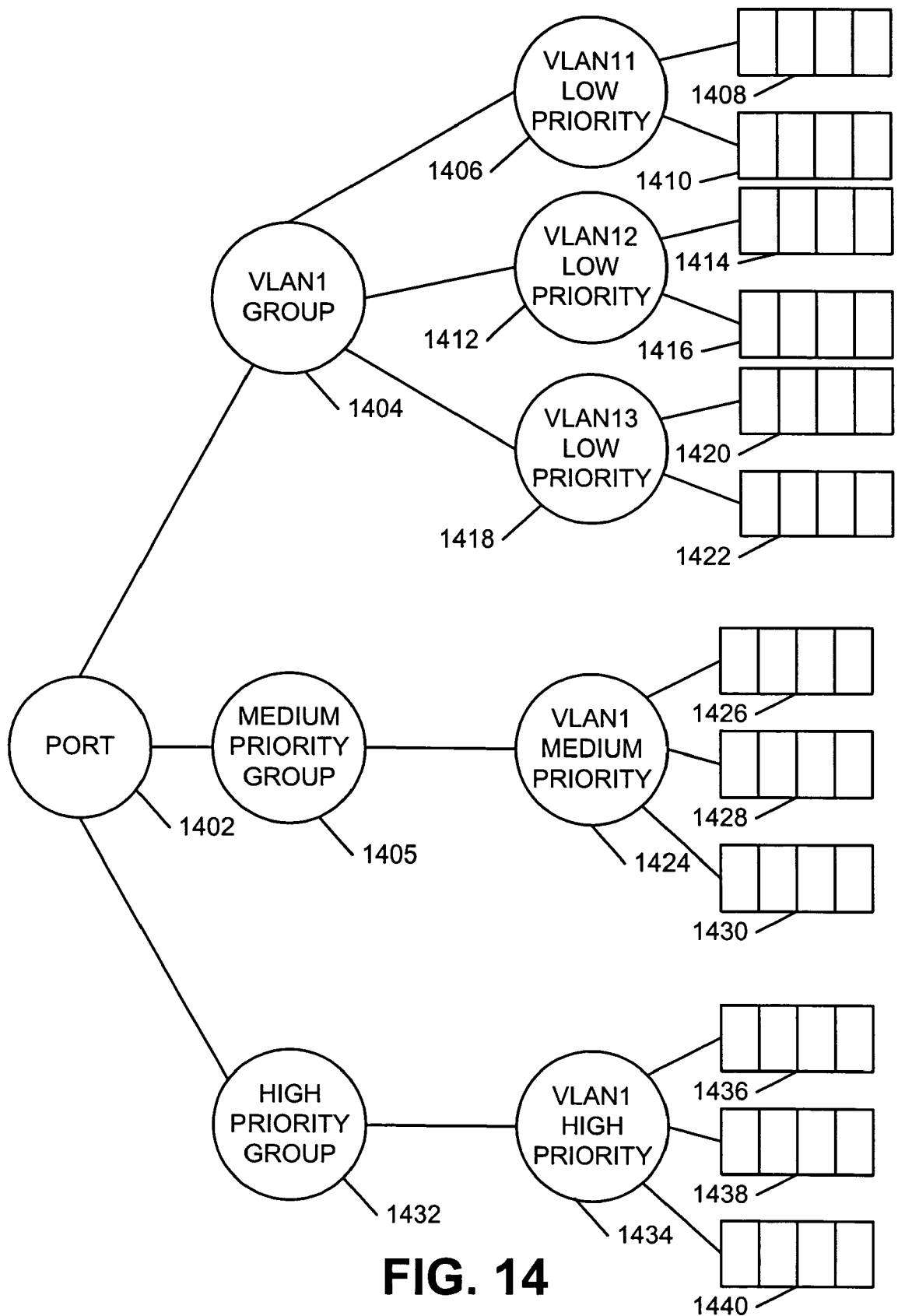
FIG. 14 illustrates an exemplary hierarchical scheduler upon which simple or compound shared shaping with VLANs may be implemented consistent with the principles of the invention.

FIG. 14, which is similar to FIG. 12, illustrates an exemplary configuration of a shared shaped that uses a stacked VLAN encapsulation. The exemplary hierarchical scheduler of FIG. 14 includes a physical Ethernet port 1402, a VLAN1 group scheduler node 1404, a VLAN11 low priority scheduler node 1406, a VLAN11 low priority data queue 1408, a VLAN11 low priority data2 queue 1410, a VLAN12 low priority scheduler node 1412, a VLAN12 low priority data queue 1414, a VLAN12 low priority data2 queue 1416, a VLAN13 low priority scheduler node 1318, a VLAN13 low priority data queue 1420, a VLAN13 low priority data2 queue 1422, a medium priority group scheduler node 1405, a VLAN1 medium priority scheduler node 1424, a VLAN11 video traffic queue 1426, a VLAN12 video traffic queue 1428, a VLAN13 video traffic queue 1430, a high priority group scheduler node 1432, a VLAN1 medium priority scheduler node 1434, a VLAN111 voice queue 1436, a VLAN12 voice queue 1438, and a VLAN13 voice queue 1440.

In this example, traffic may be one of several traffic classes, voice, video, data, and a new data class, data2. Traffic may arrive via physical Ethernet port 1402. Network device 202 may forward low priority VLAN1 traffic from port 1402 to VLAN1 group scheduler node 1404. In this example, VLAN1 includes traffic for VLAN11, VLAN12 and VLAN13. VLAN1 group scheduler 1404 may then forward traffic to VLAN11 low priority scheduler node 1406, VLAN12 low priority scheduler node 1412 or VLAN13 low priority scheduler node 1418. VLAN11 low priority scheduler 1406 may then forward VLAN11 data traffic to queue 1408 and VLAN11 data2 traffic to queue 1410. VLAN12 low priority scheduler node 1412 may forward data traffic to queue 1414 and data2 traffic to queue 1416. VLAN13 low priority scheduler node 1418 may forward data traffic to queue 1420 and data2 traffic to queue 1422.

Medium priority group scheduler node 1405 may forward VLAN1 traffic to VLAN1 medium priority scheduler node 1424. VLAN1 medium priority scheduler node 1424 may then forward VLAN11 video traffic to queue 1426, VLAN12 video traffic queue 1428, and VLAN13 video traffic to queue 1430.

High priority group scheduler node 1432 may forward VLAN1 traffic to VLAN1 high priority scheduler node 1434. VLAN1 high priority scheduler node 1434 may then forward VLAN1 voice traffic to queue 1436, VLAN2 voice traffic queue 1438, and VLAN3 voice traffic queue 1440.

In the above exemplary shared shaper of FIG. 14, VLAN 1 corresponds to VP1 of FIG. 12 and VLANs 11-13 correspond to VCs 1-3 of FIG. 12, respectively. The simple or compound shared shaping procedures of FIGS. 5, 7, and 9-11 may be employed with the exemplary shared shaper of FIG. 14 by, for example, substituting an inner VLAN tag for a VP and an outer VLAN tag for a VC, or alternatively, substituting an outer VLAN tag for a VP and an inner VLAN tag for a VC.

CONCLUSION

The foregoing description describes implementations of network devices that may shape bandwidth and share unused bandwidth with constituents of different priorities. The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, configurations other than those described may be possible. For example, five priorities of traffic may be defined.

While series of acts have been described with regard to FIGS. 5, 7, and 9-11, the order of the acts is not critical. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. In a network device, a method for sharing bandwidth among a plurality of classes of traffic for an interface, the method comprising:
    allocating bandwidth to at least one traffic class of a first priority for the interface, where the allocating bandwidth includes:
        obtaining a current rate credit for a constituent of the interface,
        obtaining a total rate credit for the interface,
        determining whether a rate deficit exists for the constituent,
        indicating that the constituent is eligible to take at least some of the bandwidth when the rate deficit exists,
        adding a minimum of the total rate credit and a rate cap for the constituent to the rate credits of the constituent, and
        subtracting the minimum of the total rate credit and the rate cap from the total rate credit; and
    allocating at least some unused bandwidth of the at least one traffic class to at least one other traffic class of a second priority for the interface.

2. The method of claim 1, where the interface is a virtual circuit.

3. The method of claim 1, where the interface is a virtual path.

4. The method of claim 1, where the interface is a virtual local area network.

5. In a network device, a method for sharing bandwidth among a plurality of classes of traffic for an interface, the method comprising:
    allocating bandwidth to at least one traffic class of a first priority for the interface, where the allocating bandwidth includes:
        obtaining a current rate credit for a constituent of the interface,
        obtaining a total rate credit for the interface,
        determining whether a rate deficit exists for the constituent, and
        indicating that the constituent is eligible to take at least some of the bandwidth when the rate deficit exists;
    adding to the current rate credit of the constituent an amount based on a weight assigned to the constituent;
    determining the amount to add to the current rate credit by multiplying an amount of bandwidth remaining, before allocating bandwidth to weighted constituents, by the assigned weight of the constituent divided by a sum of all weights for weighted constituents of the interface; and
    allocating at least some unused bandwidth of the at least one traffic class to at least one other traffic class of a second priority for the interface.

6. A network device for receiving and forwarding traffic in a computer network, the network device including a scheduler to:
    provide bandwidth for at least one traffic class of a first priority of an interface, where the providing bandwidth including:
        obtaining a current rate credit for a constituent of the interface,
        obtaining a total rate credit for the interface,
        determining whether a rate deficit exists for the constituent, and
        indicating that the constituent is eligible to take at least some of the bandwidth when the rate deficit exists;
    add to the current rate credit of the constituent an amount based on a weight assigned to the constituent;
    determine the amount to add to the current rate credit by multiplying an amount of bandwidth remaining, before allocating bandwidth to weighted constituents, by the assigned weight of the constituent divided by a sum of all weights for weighted constituents of the interface; and
    provide at least some unused bandwidth of the at least one traffic class for at least one other traffic class of a second priority.

7. The network device of claim 6, where the scheduler further provides bandwidth to traffic classes having higher priorities before providing bandwidth to traffic classes having lower priorities.

8. The network device of claim 6, where the interface is a virtual circuit.

9. The network device of claim 6, where the interface is a virtual path including a plurality of virtual circuits.

10. The network device of claim 6, where the interface is a virtual local area network.

11. A network device for receiving and forwarding traffic in a computer network, the network device comprising:

means for providing bandwidth for at least one traffic class of a first priority of an interface, where the means for providing bandwidth includes:

means for obtaining a total rate credit for the interface, means for determining whether a rate deficit is greater than 0 for a constituent, and means for determining an amount of rate credit to provide to the constituent based on an assigned weight of the constituent, where the amount of rate credit to provided to the constituent based on an assigned weight of the constituent is determined by multiplying an amount of bandwidth remaining before allocating bandwidth to weighted constituents by the assigned weight of the constituent divided by a sum of all weights for weighted constituents of the interface;

means for moving the amount of rate credit from the total rate credit to a current rate credit of the constituent when the rate deficit is greater than zero; and means for providing unused bandwidth of the at least one traffic class to at least one other traffic class of a second priority of the interface.

12. The network device of claim 11, wherein the means for providing bandwidth for at least one traffic class of a first priority of an interface provides bandwidth to traffic classes of higher priorities before providing bandwidth to traffic classes of lower priorities.

13. The network device of claim 11, where the interface is one of a virtual circuit, a virtual path, or a virtual local area network.

* * * * *